Patented Dec. 26, 1922.

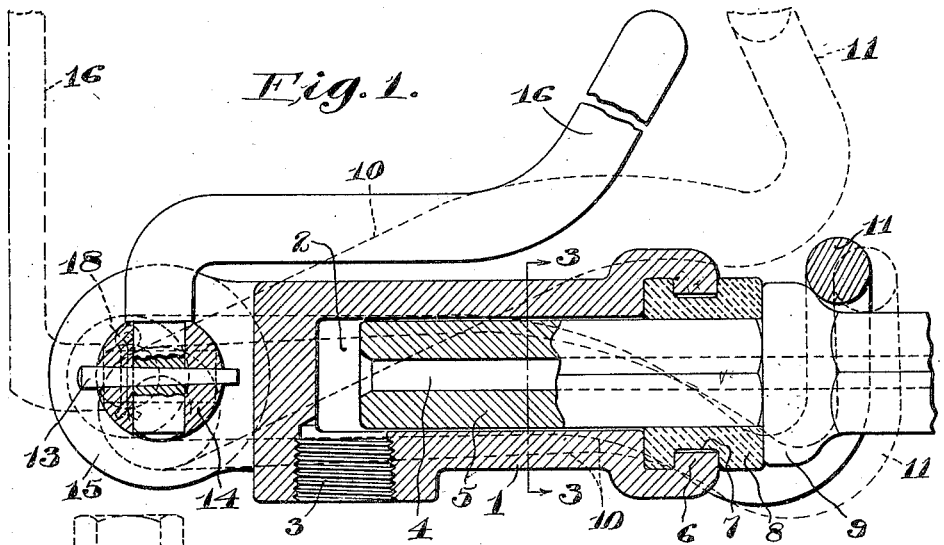
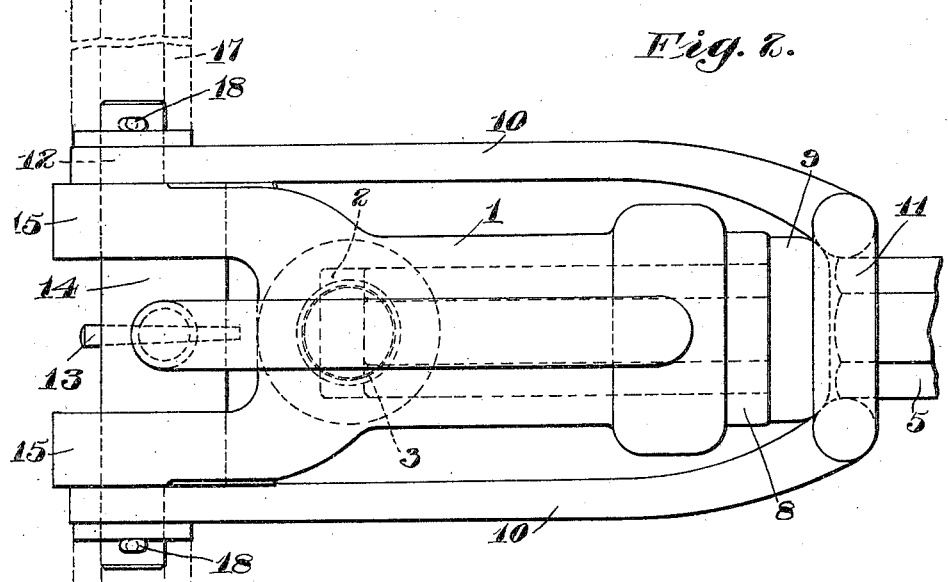
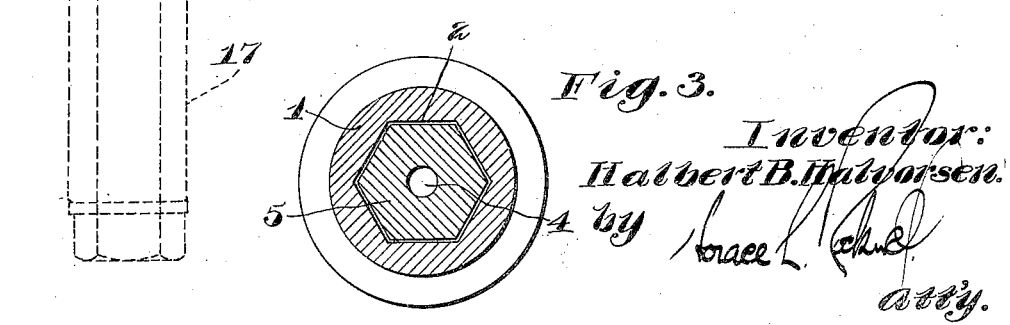

1,440,075

UNITED STATES PATENT OFFICE.

HALBERT B. HALVORSEN, OF CHICAGO, ILLINOIS, ASSIGNOR TO SULLIVAN MACHINERY COMPANY, A CORPORATION OF MASSACHUSETTS.

DRILL.

Application filed April 29, 1918. Serial No. 231,426.

*To all whom it may concern:*

Be it known that I, HALBERT B. HALVORSEN, a citizen of the United States, residing at Chicago, in the county of Cook and State of Illinois, have invented certain new and useful Improvements in Drills, of which the following is a full, clear, and exact specification.

My invention relates to drills.

It has for its object to provide an improved, simplified and rugged means adapted to remove a stuck drill steel. A further object of my invention is to provide improved means whereby the drill steel may be clamped to the removing means, whereby the latter may be manipulated in such a manner as to release the inner end of the steel from the hole. These and other objects of my invention will, however, hereinafter more fully appear.

In the accompanying drawings I have shown for purposes of illustration one embodiment which my invention may assume in practice.

In these drawings,—

Fig. 1 is a side elevation, partially in section, of my improvement applied to a drill steel, the clamping member being shown in different positions.

Fig. 2 is a plan view of the same.

Fig. 3 is a sectional view taken on line 3—3 of Fig. 1.

In this illustrative construction, it will be observed that I have shown a cap or socket member 1 provided with a longitudinal socket 2 of substantially the same cross section as the drill steel, herein polygonal, and adapted to be fitted over the end of the drill steel after the drill has been removed therefrom. It will also be noted that this member 1 is provided with an opening 3, preferably in the form of a lateral opening disposed adjacent one end of the socket 2, which opening is adapted to receive a suitable pipe in such a manner that a fluid, preferably air, may be supplied to the socket 2 and therefrom through the usual axial opening 4 in a hollow drill steel 5. Attention is also directed to the fact that this member 1 has provided upon its front end, a holding flange 6 extending into a suitable annular groove 7 in an inner bushing 8, which is itself preferably formed of a yielding or resilient material and adapted to fit snugly upon the shank of the steel, and, when the member 1 is in operative position, to be pressed between the flange 6 and the usual collar 9 formed on the drill steel. Obviously, this bushing 8 may be formed of various materials, but it will be noted that I have herein shown the same as formed of rubber, as I find that this material acts very successfully to perform the desired functions.

Cooperating with the member 1, and preferably carried thereon, is an improved means for clamping the same to the drill steel. This means, as shown herein, includes a preferably rigid clamping member comprising substantially parallel arms 10 disposed on opposite sides of the member 1 and extending from a point in rear of the member 1 to a point beyond the collar 9, where a yoke 11 connecting these arms is adapted to fit around the drill shank and abut against the outer surface of the collar to clamp the parts together when the clamping member is adjusted into clamping position. As shown, the arms 10 of this clamping member are journaled on a transverse rod or shaft 12 so that the arm 10 may move about this rod as a pivot to the several positions shown in Fig. 1. As illustrated herein, it will also be observed that this rod 12 is fixed eccentrically, as by a pin 13, to a larger shaft 14 journaled in spaced rearwardly extending arms 15 formed on the member 1, so that when this larger shaft is rotated a longitudinal movement is imparted to the members 10 in such a manner as to move the yoke 11 relative to the collar 9 and thereby clamp or unclamp the collar between the yoke and the member 1. Obviously, various means may be utilized to rotate the shaft 14 in order to obtain this action. However, it will be noted that I have shown herein a crank 16 which is fixed to the shaft 14 and is of sufficient length to enable a substantial leverage to be obtained and thereby enable the clamping mechanism to be operated with great facility. Attention is also directed to the fact that the rod 12, as shown herein, is extended at opposite sides of the arms 10 and provided with grips 17, attached thereto by suitable pins 18, so that the operator, if desired, may rotate the shaft 14 by simply rotating these grips.

In the use of my improved construction, the member 1 is first moved over the end of the stuck steel until its bushing 8 is brought as close as possible to the collar 9, the clamping yoke in the meantime being held out of the way, as for instance in the upper dotted line position shown in Fig. 1. Then the yoke 11 is moved into the lower dotted line position indicated in that figure, i. e., into position on the opposite side of the collar 9 from the bushing 8, and the shaft 14 is then operated to reciprocate the yoke to the full line or clamping position shown, either by a swinging movement of the crank 16 to the right (Fig. 1) or by a rotation of the grips 17. In the clamping position of the parts, it will be observed that the member 1 is securely attached to the steel so that that member and the steel in effect form a single element. With the parts thus clamped, air may obviously be supplied through the opening 3 into the axial opening 4 of the hollow drill steel in such a manner as to cause it to exert a releasing action upon the material wedging the steel in the hole. It will also be evident that by means of either the crank 16 or the grips 17, the member 1 and the attached drill steel may be rotated or churned in the hole as desired, in such a manner as to release the steel or to assist the air supply in releasing the same.

As a result of my improvement, it will be observed that an exceedingly simple and relatively cheap device is produced which is adapted to be applied with great facility to the protruding end of a stuck steel and to be used very conveniently by an operator to release the steel from the hole. Attention is also directed to the fact that the construction shown is exceedingly rugged and well adapted to withstand the rough usage to which such devices are subjected in service, the only part which is at all susceptible to wear being the bushing 8, which may, obviously, be changed whenever desired. These and other advantages of my improved construction will, however, be clearly apparent to those skilled in the art.

While I have in this application specifically described one embodiment which my invention may assume in practice, it is to be understood that this form of the same is used for purposes of illustration and that the invention may be modified and embodied in various other forms without departing from its spirit or the scope of the appended claims.

What I claim as new and desire to secure by Letters Patent is:

1. In combination, a drill steel receiving member, a cooperating clamping member, and a member cooperating with said first named members having eccentrically arranged cylindrical portions, one of said members being pivoted on one of said portions and the other of said members being pivoted upon another of said portions.

2. In combination, a drill steel receiving member, a cooperating clamping member carried thereby, and means for reciprocating one of said members relative to the other, said means being operative to prevent relative rotation of said members.

3. In combination, a drill steel receiving member, a cooperating clamping member carried thereby, and means for moving said clamping member longitudinally of said receiving member comprising a hinge permitting angular swinging movement between said members about the axis of said hinge, the longitudinal movement of said clamping member by said means while said steel receiving member remains stationary being accompanied by movement of said hinge axis in which the latter always remains parallel to a fixed line.

4. In combination, a drill steel receiving member, a cooperating clamping member carried thereby, and means including an element having eccentric bearing portions for reciprocating one of said members relative to the other.

5. In combination, a drill steel receiving member, a cooperating clamping member carried thereby, and means including an element provided with eccentric bearing portions for reciprocating said clamping member relative to said drill steel receiving member.

6. In combination, a drill steel receiving member, an element provided with eccentric bearing portions rotatably mounted thereon, and a cooperating clamping member carried on said receiving member and movable into or out of clamping position as said element is rotated.

7. In combination, a drill steel receiving member, a cooperating clamping member carried thereon and reciprocable relative thereto and movable angularly relative thereto, and means for moving said clamping member longitudinally without permitting rotation thereof.

8. In combination, a drill steel receiving member, a clamping member carried thereon and reciprocable relative thereto and movable angularly relative thereto, and means for reciprocating said clamping member without permitting rotation thereof.

9. In combination, a drill steel receiving member, a clamping member carried thereby, reciprocable relative thereto and movable angularly relative thereto, and means including an element provided with eccentric bearing portions for reciprocating said clamping member.

10. In combination, a drill steel receiving member having a journal on its rear end, a shaft disposed in said journal and provided with an eccentric portion, and a yoke disposable over a steel at the opposite end of said receiving member and movable with said eccentric portion.

11. In combination, a drill steel receiving member, a shaft journaled thereon and provided with eccentric bearing portions, and a clamping member reciprocable relative to said receiving member upon rotation of said shaft and movable angularly relative thereto.

12. In combination, a drill steel receiving member, a shaft journaled thereon and provided with eccentric bearing portions, a clamping member reciprocable relative to said receiving member upon movement of said shaft, and means for rotating said shaft.

13. In combination, a drill steel receiving member, a shaft journaled thereon and provided with eccentric bearing portions, a clamping member reciprocable relative to said receiving member upon movement of said shaft, and means including a crank for rotating said shaft.

14. In combination, a drill steel receiving member, a shaft journaled thereon and provided with eccentric bearing portions, a clamping member reciprocable relative to said receiving member upon movement of said shaft, and means for rotating said shaft or turning said receiving member bodily about the axis of the steel.

15. In combination, a drill steel receiving member, a shaft journaled thereon and provided with eccentric bearing portions, a clamping member reciprocable relative to said receiving member upon movement of said shaft, and means including a crank for rotating said shaft or turning said receiving member bodily about the axis of the steel.

16. In combination, a drill steel receiving member, a shaft journaled thereon and provided with eccentric bearing portions, a clamping member reciprocable relative to said receiving member upon movement of said shaft, and means including a plurality of oppositely extending handles for rotating said shaft.

17. In combination, a plurality of drill steel clamping members, one reciprocable relative to the other and adapted to be disposed on opposite sides of a lateral projection on the shank of a drill steel, and means including a rotatable member having eccentric portions operable to reciprocate said movable member into clamping position.

18. In combination, a plurality of drill steel clamping members, one reciprocable relative to the other and adapted to be disposed on opposite sides of a lateral projection on the shank of a drill steel, a rotatable member having eccentric portions operable to reciprocate said movable member into clamping position, and means for turning said members bodily about the axis of a steel.

In testimony whereof I affix my signature.

HALBERT B. HALVORSEN.